(No Model.)
D. HESS.
BORING POST HOLES.
No. 392,918. Patented Nov. 13, 1888.
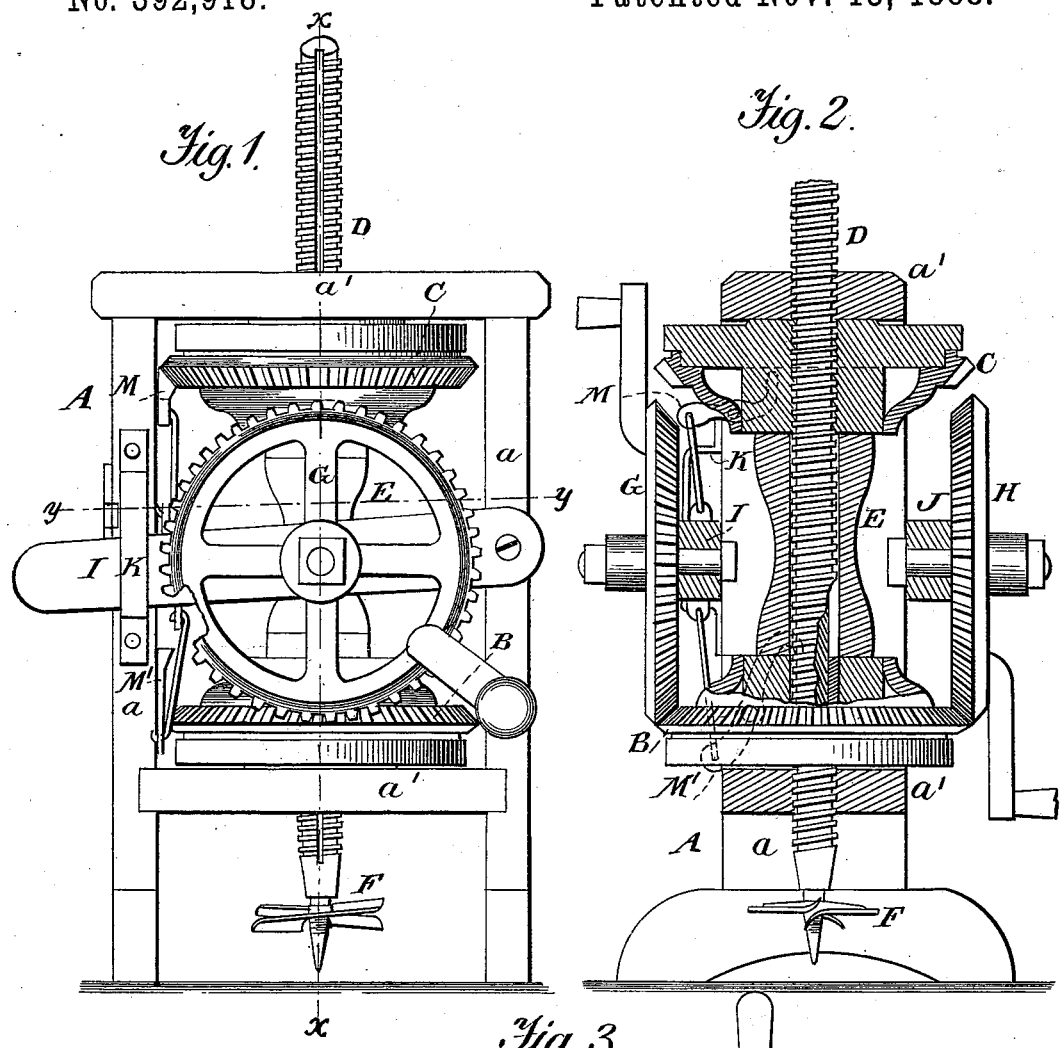
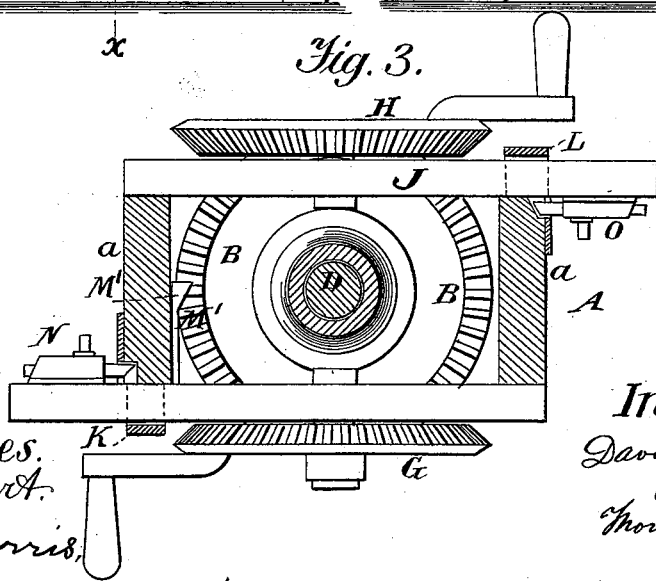
Witnesses.
A. Ruppert.
W. T. Purvis.
Inventor.
David Hess.
Per
Thomas P. Simpson.
atty.

UNITED STATES PATENT OFFICE.

DAVID HESS, OF LONGLEY, OHIO.

BORING POST-HOLES.

SPECIFICATION forming part of Letters Patent No. 392,918, dated November 13, 1888.

Application filed April 2, 1888. Serial No. 269,261. (No model.)

*To all whom it may concern:*

Be it known that I, DAVID HESS, a citizen of the United States, residing at Longley, in the county of Wood and State of Ohio, have invented certain new and useful Improvements in Boring Post-Holes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to make an apparatus with which holes may be bored in the earth for posts of any kind with a minimum of labor, expense, and time.

Figure 1 of the drawings is a side elevation; Fig. 2, a vertical section on line $x$ $x$ of Fig. 1, and Fig. 3 a horizontal section on line $y$ $y$ of Fig. 1.

In the drawings, A represents the frame, consisting of the standards $a$ $a$ and cross-pieces $a'$ $a'$.

B is a crown-wheel at bottom, and C another at top, the former keyed to the screw D and the latter centrally threaded to work on it. Between the wheels B C, and loosely surrounding the screw, is the hollow spacer E.

The parts B C D E are axially in the same perpendicular plane. On the lowering of the screw D the well-known auger F is rotated by the wheel B and fed down by the wheel C.

G H are two vertically-arranged crank-wheels, journaled in levers I J and meshing with either of the wheels B C. By raising or lowering the levers in the keepers K L the wheels G H may be made to mesh with either of the wheels B C, and then locked by the detents M M'.

In order to bore with the auger the spring-catches N O are unfastened, the levers unlocked, and the levers carried to the bottom of their keepers, when they are again locked. By this movement the wheel C is locked, while the wheel B revolves to rotate the keyed screw. The screw D, rotating in and through the wheel C, which is now fixed by the pawls or detents M M', feeds the auger into the ground. The work is then continued until it is desired to bring up the "borings" which rest upon the auger, when the levers are unlocked, raised to the top of their keepers, and again made fast, thus locking the bottom wheel, B, and unlocking the wheel C, which is now brought into gear with the crank-wheels. The latter are now rotated in a direction the reverse of that used when boring. The auger-screw D, being keyed to the locked wheel B, cannot turn; but the nut-wheel turns so as to make a reverse movement upward in the screw, so as to lift and carry up the borings, which are removed and the boring resumed as before.

Having thus described all that is necessary to a full understanding of the invention, what I claim as new, and desire to protect by Letters Patent, is—

1. The described means for carrying down the auger as it rotates and bringing it up without rotation, which consists of the spaced horizontal bevel-wheels B C, the screw D, keyed to wheel B and working in a nut of wheel C, the locking pawls or detents M M', and one or more crank-wheels journaled in shifting devices, substantially as shown and described.

2. The detents M M', combined with shifting-levers I J and wheels B C G H, as and for the purpose set forth.

3. The spring-catches N O, combined with the shifting-levers I J and wheels B C, as and for the purpose specified.

In testimony whereof I affix my signature in presence of two witnesses.

DAVID HESS.

Witnesses:
JUNIUS V. JONES,
JOHN C. LAY.